United States Patent
Baudu et al.

(10) Patent No.: US 12,030,407 B2
(45) Date of Patent: Jul. 9, 2024

(54) METHOD FOR DETERMINING AN OCCUPANCY STATUS OF A SEAT AND CORRESPONDING DETERMINATION SYSTEM

(71) Applicant: FAURECIA Sièges d'Automobile, Nanterre (FR)

(72) Inventors: Samuel Baudu, Boulogne Billancourt (FR); Mamadou Balde, Morigny-Champigny (FR); Stéphane Le Roux, Lardy (FR); Mohamed Rouchou, Juvisy sur Orges (FR)

(73) Assignee: FAURECIA Sièges d'Automobile, Nanterre (FR)

( * ) Notice: Subject to any disclaimer, the term of this patent is extended or adjusted under 35 U.S.C. 154(b) by 167 days.

(21) Appl. No.: 17/534,746

(22) Filed: Nov. 24, 2021

(65) Prior Publication Data

US 2022/0169151 A1 Jun. 2, 2022

(51) Int. Cl.
*B60N 2/00* (2006.01)
*B60R 21/015* (2006.01)
(Continued)

(52) U.S. Cl.
CPC ........ *B60N 2/002* (2013.01); *B60R 21/01516* (2014.10); *B60R 21/01532* (2014.10);
(Continued)

(58) Field of Classification Search
CPC .. B60N 2/002; G01V 3/088; B60R 21/01516; B60R 21/01532; B60R 21/01556; G01G 7/06; G01G 19/4142; G01L 1/14
See application file for complete search history.

(56) References Cited

U.S. PATENT DOCUMENTS 6,392,550 B1 5/2002 Najor
2006/0033507 A1 2/2006 Gaumel
(Continued)

FOREIGN PATENT DOCUMENTS

DE 4237072 C1 12/1993
EP 1533193 B1 5/2005
(Continued)

OTHER PUBLICATIONS

French Preliminary Search Reprot for FR2012255 dated Aug. 16, 2021, 46 pages, No English translation available.

*Primary Examiner* — Amy He
(74) *Attorney, Agent, or Firm* — Barnes & Thornburg LLP (57) ABSTRACT

The present disclosure relates to a method for determining the occupancy status of a seat of a motor vehicle, the method being implemented by a determination system comprising a seat, six interdigitated capacitive sensors, and a controller comprising a reference capacitance value and a threshold value for each interdigitated capacitive sensor, the method comprising a step of measuring three capacitance values for each interdigitated capacitive sensor, the following steps being implemented by the controller for the measured capacitance values: calculating a resulting capacitance value based on the measured capacitance values, calculating the difference between the resulting capacitance value and the reference capacitance value, comparing the calculated difference to the threshold value, determining the occupancy status of the seat, based on the result of the comparison.

18 Claims, 4 Drawing Sheets

(51) Int. Cl.
*G01L 1/14* (2006.01)
*G01V 3/08* (2006.01)
(52) U.S. Cl.
CPC .......... *B60R 21/01556* (2014.10); *G01L 1/14* (2013.01); *G01V 3/088* (2013.01)

(56) References Cited

U.S. PATENT DOCUMENTS

| | | | | |
|---|---|---|---|---|
| 2011/0221453 | A1* | 9/2011 | Hwang | B60R 21/0154 |
| | | | | 324/661 |
| 2012/0146668 | A1* | 6/2012 | Satake | B60R 21/015 |
| | | | | 324/662 |
| 2021/0016683 | A1* | 1/2021 | Balde | B60N 2/64 |

FOREIGN PATENT DOCUMENTS

| | | | |
|---|---|---|---|
| EP | 1685431 | B1 | 1/2007 |
| EP | 3429406 | A1 | 1/2019 |
| WO | 2013030009 | A1 | 3/2013 |
| WO | 2019172063 | A1 | 9/2019 |

\* cited by examiner

METHOD FOR DETERMINING AN OCCUPANCY STATUS OF A SEAT AND CORRESPONDING DETERMINATION SYSTEM

PRIORITY CLAIM

This application claims priority to French Patent Application No. FR2012255, filed Nov. 27, 2020, which is expressly incorporated by reference herein.

BACKGROUND

The present disclosure relates to a method for determining the occupancy status of a seat and the corresponding determination system

SUMMARY

According to the present disclosure, a method for determining the occupancy status of a seat of a motor vehicle, the method being implemented by a determination system comprising a seat, at least six interdigitated capacitive sensors carried by the seat, and a controller connected to the interdigitated capacitive sensors, the controller comprising a memory comprising a database, the database comprising at least one reference capacitance value and one threshold value for each interdigitated capacitive sensor, the method comprising a step of measuring at least three capacitance values by each interdigitated capacitive sensor.

In illustrative embodiments, the following steps being implemented by the controller for the capacitance values measured by each interdigitated capacitive sensor:
  calculating a resulting capacitance value based on at least two measured capacitance values,
  calculating the difference between the resulting capacitance value and the reference capacitance value,
  comparing the calculated difference to the threshold value,
  determining the occupancy status of the seat, based on the result of the comparison.

In illustrative embodiments, the method further comprises a step of determining a minimum capacitance value and a maximum capacitance value among the measured capacitance values, and the step of calculating the resulting capacitance value is a step of calculating an average capacitance value based on the minimum capacitance value and maximum capacitance value.

In illustrative embodiments, the step of calculating the resulting capacitance value is a step of calculating an average capacitance value based on the at least two measured capacitance values.

In illustrative embodiments, the database further comprises first capacitance variation ranges defined for the interdigitated capacitive sensors, each first variation range being defined for an interdigitated capacitive sensor, the first variation ranges being representative of a status of occupied by a person, and the method further comprises, for each interdigitated capacitive sensor, a step of comparing the calculated difference to the first variation range, the determined occupancy status being the status of occupied by a person when the differences calculated for each interdigitated capacitive sensor are comprised within the first variation ranges.

In illustrative embodiments, the database further comprises at least two capacitance variation subdomains defined for each interdigitated capacitive sensor, each capacitance variation subdomain being representative of a morphological type of a person, and the method comprises the following steps:
  comparing the calculated differences to at least two capacitance variation subdomains; and
  determining a morphological type of the person sitting in the seat, based on the result of the comparison.

In illustrative embodiments, the database further comprises second capacitance variation ranges defined for the interdigitated capacitive sensors, each second variation range being defined for a capacitance sensor, the second variation ranges being representative of a status of occupied by a thing, an animal, or a child, and the method further comprises, for each interdigitated capacitive sensor, a step of comparing the calculated difference to the second variation range, the determined occupancy status being the status of occupied by a thing, an animal, or a child, when the average capacitance values calculated for each interdigitated capacitive sensor are comprised within the second capacitance variation ranges.

In illustrative embodiments, the database further comprises at least two capacitance variation subdomains defined for the interdigitated capacitive sensors and respectively, each capacitance variation subdomain being representative of a range of child age values, and the method further comprises the following steps:
  comparing the calculated differences to at least two capacitance variation subdomains, and
  determining a range of child age values, based on the result of the comparison.

In illustrative embodiments, the measurement step is implemented each time a door of the motor vehicle is opened or unlocked.

In illustrative embodiments, the measurement step is implemented each time a door of the motor vehicle is closed or locked.

In illustrative embodiments, the implementation of the measurement step lasts less than three seconds and preferably less than one second.

In illustrative embodiments, the memory comprises, for each interdigitated capacitive sensor, a curve representing average capacitance values as a function of time, and a determined deviation, and the method further comprises the following steps, implemented, for each interdigitated capacitive sensor, after the step of determining a maximum capacitance value and a minimum capacitance value:
  selecting a determined number of last capacitance values of the curve, the determined number being between 5 and 20, and preferably equal to 10,
  calculating the difference between the minimum capacitance value and the selected values,
  calculating the difference between the maximum capacitance value and the selected values,
  if at least one of the differences is greater than the deviation, the method returns to the measurement step,
  if the differences are less than the deviation, the method continues via the step of calculating a resulting capacitance value.

In illustrative embodiments, when the differences are less than the deviation, the method comprises a step of saving the average capacitance value in the curve.

In illustrative embodiments, the curve comprises a capacitance value measured after the manufacture of the seat and before its mounting in the vehicle, a capacitance value measured after the mounting of the seat in the motor vehicle, and a capacitance value measured before its first use.

In illustrative embodiments, a system for determining the occupancy status of a seat of a motor vehicle comprises:
- a motor vehicle seat comprising:
  - a seating portion having a receiving face intended to accommodate a person, the receiving face being divided into a front area and a rear area, the front area and the rear area being located one on either side of a transverse central plane of the seat,
  - a backrest having a receiving face intended to accommodate the back of a person, the backrest being hinged to the seating portion, the rear area of the receiving face of the seating portion being adjacent to the backrest,
  - only three interdigitated capacitive sensors carried by the receiving face of the backrest, and only three interdigitated capacitive sensors carried by the receiving face of the seating portion, a first interdigitated capacitive sensor being located on an upper side area of the receiving face of the backrest, the second interdigitated capacitive sensor being located on a lower area or a central area of the receiving face of the backrest, the third interdigitated capacitive sensor being located on a side area of the receiving face of the backrest, the third interdigitated capacitive sensor being located at a lower position relative to the second capacitive sensor, the second interdigitated capacitive sensor being laterally offset towards the center relative to the first and third interdigitated capacitive sensors,
  - the fourth interdigitated capacitive sensor being located on a lateral portion of the rear area of the receiving face of the seating portion, the fifth interdigitated capacitive sensor being located on a rear or central area of the receiving face of the seating portion, the sixth interdigitated capacitive sensor being located on a lateral portion of the front area of the receiving face of the seating portion, the fifth interdigitated capacitive sensor being laterally offset towards the center relative to the fourth and sixth interdigitated capacitive sensors, the fifth interdigitated capacitive sensor being located longitudinally between the fourth and sixth interdigitated capacitive sensors,
- a controller suitable for implementing the method for determining the occupancy status of a seat according to the characteristics mentioned above.

In illustrative embodiments, the second interdigitated capacitive sensor is laterally positioned in the center of the receiving face of the seat, and the fifth interdigitated capacitive sensor is laterally positioned in the center of the receiving face.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
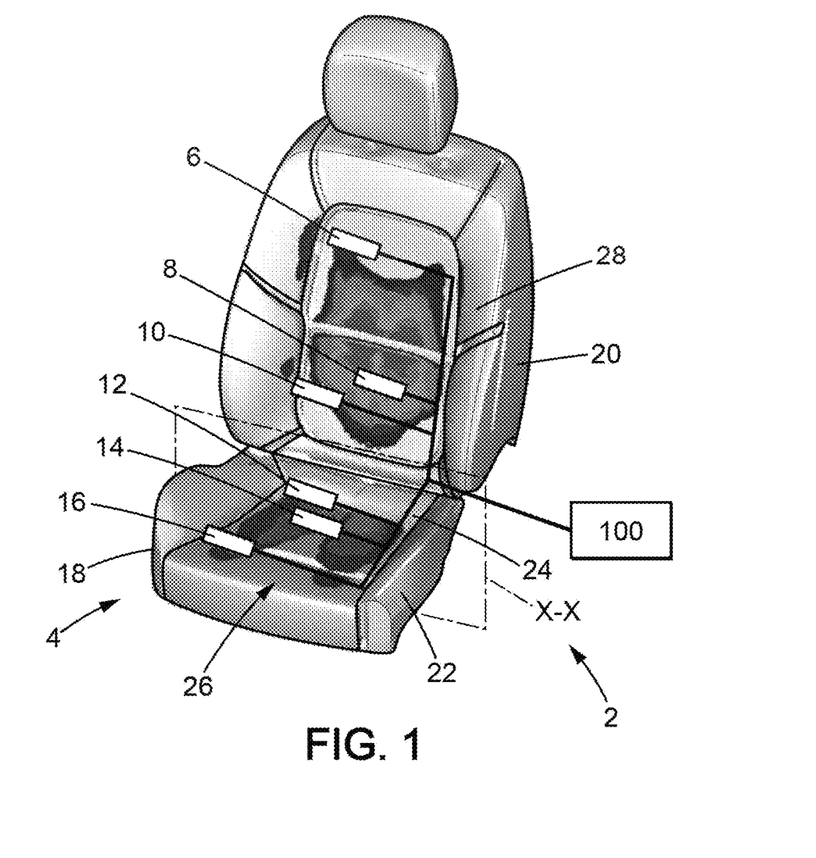
FIG. 1 is a schematic view of a first example of a determination system according to the present disclosure.

Referring to FIG. 1, the determination system 2 according to this disclosure comprises a motor vehicle seat 4, six interdigitated capacitive sensors 6, 8, 10, 12, 14, 16 carried by the seat, and a controller 100 electrically connected to the interdigitated capacitive sensors.

The seat 4 has a seating portion 18 and a backrest 20 hinged to the seating portion.

In particular, the seating portion 18 comprises a receiving face 22 intended to accommodate a person or an object. For the purposes of this description, we state that the receiving face of the seat is shared by a transverse central plane X-X in an area adjacent to the backrest, called the "rear area" 24, and in an area located on the side opposite to the backrest, called the "front area" 26.

The backrest 20 also comprises a receiving face 28 suitable for receiving the back of a person or a face of an object. In this disclosure, the receiving face 28 of the backrest carries three interdigitated capacitive sensors of the determination system. FIG. 1 shows an advantageous exemplary positioning of the interdigitated capacitive sensors. This positioning was chosen by taking into account the areas of support for a person sitting in the seat.

A first interdigitated capacitive sensor 6 is placed on an upper side area of the receiving face of the backrest. Thus, the first interdigitated capacitive sensor 6 is positioned at a location on the receiving face of the backrest which corresponds to an area of support for a shoulder blade of the person sitting in the seat and leaning against the backrest.

A second interdigitated capacitive sensor 8 is located in a lower area and laterally centered on the receiving face of the backrest. The second interdigitated capacitive sensor 8 is positioned at a location on the receiving face of the backrest which corresponds to an area of support for the lumbar vertebrae of the person. Alternatively, the second interdigitated capacitive sensor 8 is located on a laterally and longitudinally centered area of the receiving face of the backrest.

A third interdigitated capacitive sensor 10 is located on a lower side area of the receiving face of the backrest. The third interdigitated capacitive sensor 10 is positioned at a location on the receiving face of the backrest which corresponds to an area of support for the buttocks of the person.

The second interdigitated capacitive sensor 8 is located horizontally between the first and third interdigitated capacitive sensors. The second interdigitated capacitive sensor is always located below the first interdigitated sensor 6.

The receiving face 22 of the seating portion also carries three interdigitated capacitive sensors of the determination system.

A fourth interdigitated capacitive sensor 12 is located on a lateral portion of the rear area 24 of the receiving face of the seating portion. The fourth interdigitated capacitive sensor 12 is positioned at a location on the receiving face of the seating portion which corresponds to an area of support for a buttock of the person sitting in the seat and leaning against the backrest.

A fifth interdigitated capacitive sensor 14 is located on a laterally centered portion of the rear area 24 of the receiving face of the seating portion. Alternatively, the fifth interdigitated capacitive sensor is located on a longitudinally central area of the receiving face of the seating portion.

A sixth interdigitated capacitive sensor 16 is located on a lateral portion of the front area 26 of the receiving face of the seating portion. The sixth interdigitated capacitive sensor 16 is positioned at a location on the receiving face of the seating portion that corresponds to an area of support for a hamstring of the person. The fifth interdigitated capacitive sensor 14 is located vertically between the fourth 12 and the sixth 16 interdigitated capacitive sensors.

Figure 2:
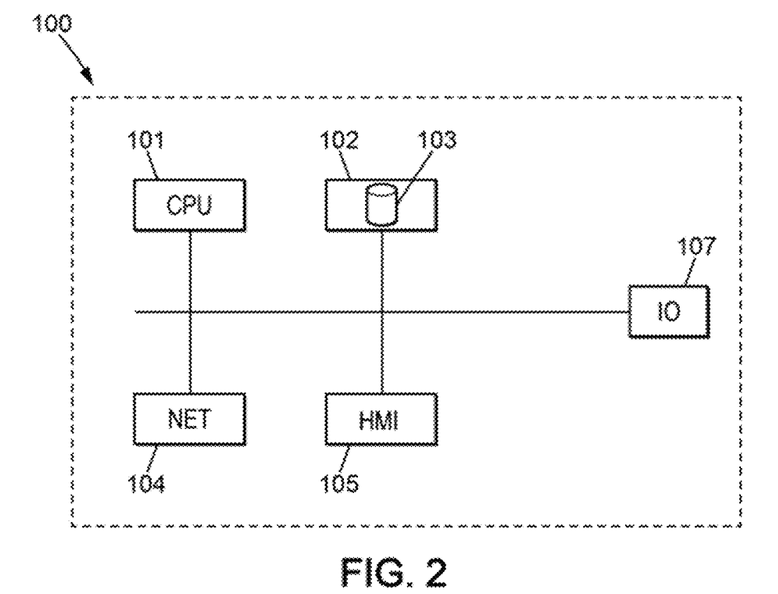
FIG. 2 is a schematic view representing an exemplary block diagram of the controller of the determination system illustrated in FIG. 1.

With reference to FIG. 2, the controller 100 of the determination system comprises a communication bus connected, for example, to a central processing unit 101, such as a processor or a microprocessor, and denoted CPU. The controller 100 also comprises a random access memory 102 (RAM), and/or a read-only memory (ROM), in particular for storing a database 103 and executable code making it possible to implement the determination method by means of the seat and the interdigitated capacitive sensors described above.

The controller 100 may be a programmable device that uses software, a specific integrated circuit (ASIC), or a part of an engine control unit (ECU). The controller may optionally comprise:
- a network interface 104 which is normally connected to a communication network over which digital data to be processed are transmitted or received,
- a user interface 105 for receiving inputs from a user or for displaying information to a user,
- an input-output module 107, denoted 10, for receiving and sending data from or to external devices such as hard drives, removable storage media, or others.

The database 103 comprises, for each interdigitated capacitive sensor:
- a reference capacitance value,
- a curve C representing the average capacitance values as a function of time, and a determined deviation E,
- at least one threshold value,
- a first variation range P1 of capacitance values representative of a seat status of occupied by a person,
- at least two capacitance variation subdomains D11, D12, D13 defined for each interdigitated capacitive sensor, each capacitance variation subdomain being representative of a morphological type of a person, the subdomains D11, D12, D13 belonging to the first variation range P1,
- a second variation range P2 of capacitance values representative of a status of occupied by a child, a animal, or a thing, and
- at least two capacitance variation subdomains D21, D22 defined for each interdigitated capacitive sensor, each capacitance variation subdomain being representative of a morphological type of a person, the subdomains D21, D22 belonging to the second range P2.

Figure 4:
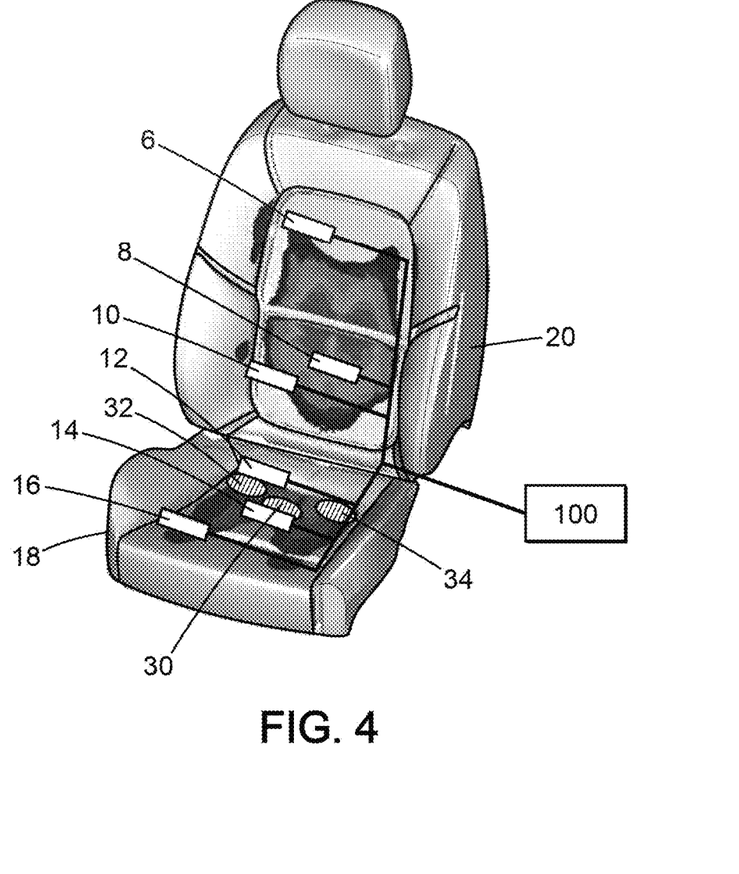
FIG. 4 is a schematic view of a second example of a determination system according to the present disclosure.

The table below contains examples for the threshold value, first variation range P1, and second variation range P2, for the six sensors of the determination system shown in FIGS. 1 and 4.

| Sensor reference | Average capacitance | Thresh. value | Second range P2 | | First range P1 | |
|---|---|---|---|---|---|---|
| 6 | 11 618 | 3 | 3 | 13 | 15 | 130 |
| 8 | 11 301 | 3 | 3 | 25 | 30 | 150 |
| 10 | 11 540 | 3 | 3 | 15 | 20 | 140 |
| 12 | 11 537 | 3 | 3 | 25 | 30 | 150 |
| 14 | 11 120 | 3 | 3 | 7.5 | 10 | 120 |
| 16 | 11 505 | 3 | 3 | 25 | 15 | 130 |

The values in this table are given in $10^{-3}$ picofarads.

The table below contains examples of three subdomains D11, D12, D13 of the first variation range P1 and two subdomains D21, D22 of the second variation range P2, for the six sensors of the determination system shown in FIGS. 1 and 4.

| Sensor reference | D21 | D22 | D11 | D12 | D13 |
|---|---|---|---|---|---|
| 6 | 5-10 | 10-13 | 15-20 | 25-60 | 60-90 |
| 8 | 5-10 | 10-13 | 30-40 | 45-90 | 15-90 |
| 10 | 5-10 | 10-13 | 15-20 | 40-80 | 15-90 |
| 12 | 5-10 | 10-13 | 15-20 | 40-60 | 15-90 |
| 14 | 5-10 | 10-13 | 10-20 | 25-35 | 40-90 |
| 16 | 5-10 | 10-13 | 15-30 | 30-50 | 50-90 |

The values in this table are given in $10^{-3}$ picofarads.

Figure 3:
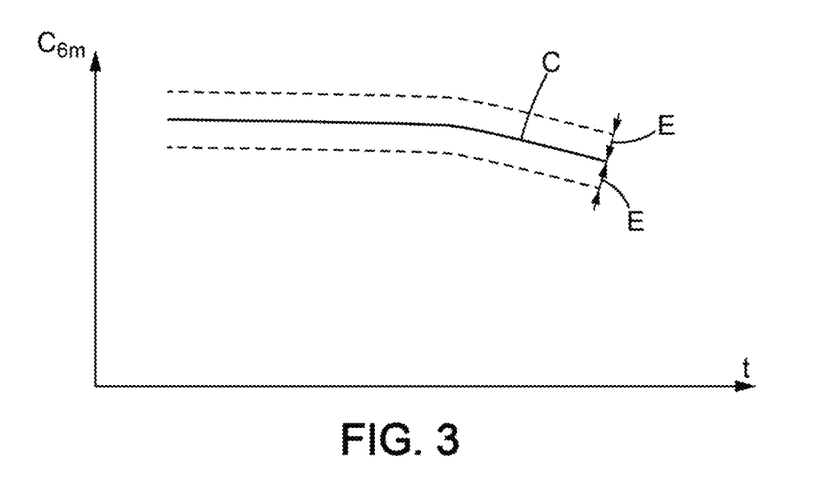
FIG. 3 is a diagram representing the variation in an average capacitance value of an interdigitated capacitive sensor of the determination system illustrated in FIG. 1, as a function of time.

FIG. 3 illustrates an example of a curve C representing the average capacitance values as a function of time of interdigitated capacitance sensor 6. This curve is different for each interdigitated capacitance sensor. The deviation E represents a capacitance measurement variation, which may be due to variations in temperature or in humidity. The diagram of FIG. 3 illustrates, by a first dotted curve, a positive deviation (of +E) relative to curve C, and by a second dotted curve, a negative deviation (of −E) relative to curve C.

In the embodiment illustrated in FIG. 1, the determination system 2 comprises a seat 4, a controller 100, and only six interdigitated capacitive sensors. In a second embodiment illustrated in FIG. 4, a determination system 3 comprises, in addition to the six interdigitated capacitive sensors, three resistive electrodes 30, 32, 34 carried by the receiving face 22 of the seating portion and connected to the controller 100 The resistive electrodes are configured to determine a contact pressure of the user's body. A resistive electrode 30 may for example be located in the center of the rear area of the receiving face of the seating portion. Two resistive electrodes 32, 34 may for example be located one on either side of a longitudinal central plane of the seating portion. In this embodiment, the resistive electrodes are positioned at a distance from the interdigitated capacitive sensors of between 10 millimeters and 50 millimeters, and preferably on the order of 20 millimeters.

Figure 5:
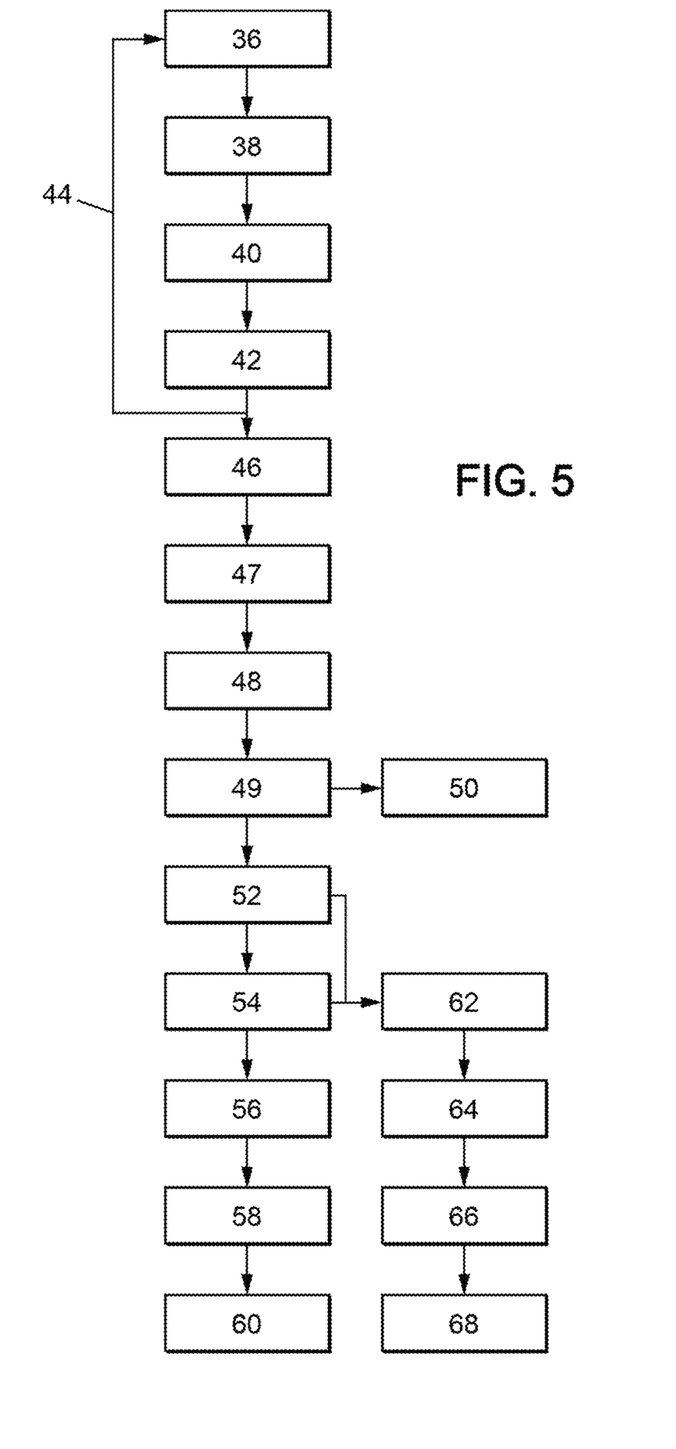
FIG. 5 is a flowchart of the steps of the determination method according to the present disclosure.

The determination method according to the present disclosure will now be described with reference to FIG. 5. This method may be implemented by the determination system 2 illustrated in FIG. 1 or by the determination system 3 illustrated in FIG. 4.

The method begins with a step 36 of measuring at least three capacitance values by the first interdigitated capacitance sensor 6. The measurement step lasts less than three seconds and preferably less than one second. The measurement step is, for example, implemented each time a door of the motor vehicle is opened or unlocked.

Alternatively, the measurement step is implemented each time a door of the motor vehicle is closed or locked.

The measurement step 36 is also implemented for the second interdigitated capacitive sensor 8, the third interdigitated capacitive sensor 10, the fourth interdigitated capacitive sensor 12, the fifth interdigitated capacitive sensor 14, and the sixth interdigitated capacitive sensor 16.

Then, the method comprises a step 38 of determining a minimum capacitance value and a maximum capacitance value among the capacitance values measured by the first interdigitated capacitance sensor 6. The determination step 38 is also implemented for the second interdigitated capacitive sensor 8, the third interdigitated capacitive sensor 10, the fourth interdigitated capacitive sensor 12, the fifth interdigitated capacitive sensor 14, and the sixth interdigitated capacitive sensor 16.

The method comprises a step 40 of selecting a determined number of last average capacitance values of the defined curve C for the first interdigitated capacitance sensor 6. This determined number is between 5 and 20. Preferably, this determined number is equal to 10.

The method further comprises a step 42 of calculating the difference between the minimum capacitance value generated by the first interdigitated capacitance sensor 6 and the values selected during step 40. Then, the differences between the maximum capacitance value generated by the first interdigitated capacitance sensor 6 and the selected values are calculated.

If at least one of the differences is greater than the deviation E stored for the first interdigitated capacitive sensor 6, the determination method returns to the measurement step during a step 44.

If the differences are less than the deviation E, the method continues with a step 46 of calculating an average capacitance value based on the maximum capacitance value and minimum capacitance value which were determined during step 38.

Alternatively, the average value is calculated directly from all of the measured capacitance values.

In parallel, if the differences are less than the deviation E, the average capacitance value is saved in the curve C during a step 47.

Steps 40, 42, 44 and 46 are also implemented for the second interdigitated capacitive sensor 8, the third interdigitated capacitive sensor 10, the fourth interdigitated capacitive sensor 12, the fifth interdigitated capacitive sensor 14, and the sixth interdigitated capacitive sensor 16.

The method further comprises a step 48 of calculating the difference between the average capacitance value and the reference capacitance value.

Then, during a step 49, the difference calculated during step 48 is compared with the threshold value $V_{s6}$ stored in the database 103 and associated with the first interdigitated capacitance sensor 6.

The step of calculating the difference 48 and the step of comparison 49 are implemented with 1) the average capacitance value of the second interdigitated capacitive sensor 8 and the threshold value $V_{s8}$ associated with the second interdigitated capacitance sensor, 2) the average capacitance value of the third interdigitated capacitive sensor 10 and the threshold value $V_{s10}$ associated with the third interdigitated capacitance sensor, 3) the average capacitance value of the fourth interdigitated capacitive sensor 12 and the threshold value $V_{s12}$ associated with the fourth interdigitated capacitive sensor, 4) the average capacitance value of the fifth interdigitated capacitive sensor 14 and the threshold capacitance value $V_{s14}$ associated with the fifth interdigitated capacitive sensor, 5) the average capacitance value of the sixth interdigitated capacitive sensor 16 and the threshold capacitance value $V_{s16}$ associated with the sixth interdigitated capacitive sensor.

If all of the calculated differences are less than the threshold values, the method includes a step 50 of determining if the seat 4 is unoccupied, meaning it is empty. The controller then transmits a signal representative of the fact that the seat is empty. This signal may, for example, be displayed on a display device of the dashboard or be transmitted to a security system of the vehicle.

If all of the average capacitance values are greater than the threshold values, the method includes a step 52 of determining whether the seat 4 is occupied by an object, an animal, or a person.

When the method has determined that the seat is occupied, the method further comprises a new step 54 of comparing the difference calculated during step 48 with the first capacitance variation range P1 defined for the first capacitance sensor 6.

Step 54 is implemented with the differences calculated for the second interdigitated capacitive sensor 8, the third interdigitated capacitive sensor 10, the fourth interdigitated capacitive sensor 12, the fifth interdigitated capacitive sensor 14, and the sixth interdigitated capacitive sensor 16, each time with the first variation ranges P1 defined for these sensors.

When the differences calculated for each interdigitated capacitive sensor are contained within the first capacitance variation ranges P1 defined for each of these sensors, the method determines the seat status as occupied by a person, during a step 56.

The method continues with a step 58 of comparing the differences calculated during step 48 with the three capacitance value subdomains D11, D12, D13 defined for each sensor.

The method comprises a step 60 of determining a morphological type of the person sitting in the seat, based on the result of the comparison (step 58). Morphological types define a weight range and a height range of an individual. For example, the total European population constitutes the domain of all morphological types.

Within this domain, subdomains are defined by classification of the total population, in particular according to the size and weight percentiles of the domain. An example of subdomain D11 comprises a portion of the morphological types of the population which meets the following condition: the height is less than or equal to the 5th percentile of the height of the European population and/or the weight is less than or equal to the 5th percentile of the weight of the European population. An example of subdomain D12 comprises a portion of the morphological types of the European population which meets the following condition: the height is less than or equal to the 50th percentile of the height of the population and/or the weight is less than or equal to the 50th percentile of the weight of the population. An example of subdomain D13 comprises a portion of the morphological types of the European population which meets the following condition: the height is greater than or equal to the 95th percentile of the size of the population and/or the weight is greater than or equal to the 95th percentile of the weight of the population.

The Asian population may be another example of a domain of all body types. Another example of a domain of all body types may be the American population. Each domain of all of these morphological types includes subdomains. The above examples are independent of each other; other examples could be given.

During step 62, the difference calculated during step 48 is compared with the second capacitance variation range P2 defined for the first capacitance sensor 6.

Step 62 is implemented with the differences calculated for the second interdigitated capacitive sensor 8, the third interdigitated capacitive sensor 10, the fourth interdigitated capacitive sensor 12, the fifth interdigitated capacitive sensor 14, and the sixth interdigitated capacitive sensor 16, each time with the second variation ranges P2 defined for these sensors.

Step 62 may be implemented directly after step 52 or after step 54 when at least one of the differences calculated during step 48 is not comprised within the first ranges P1.

When the differences calculated for each interdigitated capacitive sensor are comprised within the second capacitance variation ranges P2 defined for each of these sensors, the method determines the seat status as being occupied by a thing, an animal, or a child, during a step 64.

The method continues with a step 66 of comparing the differences calculated during step 48 with the three capacitance value subdomains D11, D12, D13 defined for each sensor.

The method includes a step 68 of determining a range of age values for a child sitting in the seat, based on the result of the comparison (step 66). The age ranges are for example from 0 to 1 year and from 1 to 6 years.

A comparative system for detecting the presence of an occupant in a vehicle seat comprising capacitive sensors 20 carried by the seat. The capacitive sensors comprise two electrodes arranged on a conductive screen 22. The measurement of the capacitance values is carried out by energizing only a first electrode, then energizing only the second electrode, finally by energizing both electrodes and observing the capacitance variations.

None of the capacitive sensors used in this comparative system is an interdigital capacitive sensor. The comparative system also does not use the steps of "calculating the difference between the value of the resulting capacitance and the reference capacitance value" and "comparison of the difference calculated at the threshold value".

A comparative method for detecting the degree of vigilance or drowsiness of a driver by measuring the pressure variation on sensors arranged on the seat. Its pressure variations make it possible to know whether the driver is slumped, leaning or upright in his seat. This comparative system uses a data processing technique using a neural network.

Another comparative method for performing gym exercises (torsion of the torso, movement of the legs, etc.) on a motor vehicle seat. For this purpose, the seat has pressure sensors. A mobile phone equipped with a specific application is connected to the vehicle. The pressure sensors make it possible to check that the driver is correctly performing the requested actions. For this purpose, the values measured by the pressure sensors are compared with pre-recorded threshold values.

Other comparative methods do not implement any of the steps of the method disclosed in the present disclosure. In addition, the sensors for implementing this comparative method are not interdigitated capacitive sensors.

There is a growing demand for devices for determining the occupancy status of a motor vehicle seat, whether it concerns a driver or a passenger.

Generally, these comparative determination devices use sensors, such as a camera or a movement sensor located above the seat for example. However, the measurements obtained by such comparative devices are obtained with a generally high response time, on the order of several seconds, which is inappropriate for providing data sufficiently quickly in certain situations, particularly in the event of an accident.

For example, there is a need to be able to adapt the properties of an airbag device intended to protect a user occupying a vehicle seat, in the event of an accident. Thus, the operation of comparative devices could be improved by adjusting the properties of an airbag and/or of a seat belt pretensioner of a vehicle seat on the basis of real-time knowledge of parameters such as the exact position of the user in the seat, the user type, user height, user weight, etc.

In addition, the measurements obtained by such comparative devices often lack robustness because the devices have difficulty tolerating disruptions which could affect them. In addition, the measurements made by these devices exhibit a drift over time. These devices are therefore unsuitable for an application in the automotive field, where a reliability period of at least ten years is needed.

In order to meet the above disadvantages as well as this or these needs, this disclosure relates firstly to a method for determining the occupancy status of a seat of a motor vehicle, the method being implemented by a determination system comprising a seat, at least six interdigitated capacitive sensors carried by the seat, and a controller connected to the interdigitated capacitive sensors, the controller comprising a memory comprising a database, the database comprising at least one reference capacitance value and one threshold value for each interdigitated capacitive sensor, the method comprising a step of measuring at least three capacitance values by each interdigitated capacitive sensor, the following steps being implemented by the controller for the capacitance values measured by each interdigitated capacitive sensor:

calculating a resulting capacitance value based on at least two measured capacitance values, calculating the difference between the resulting capacitance value and the reference capacitance value, comparing the calculated difference to the threshold value, determining the occupancy status of the seat, based on the result of the comparison.

According to one embodiment, the method further comprises a step of determining a minimum capacitance value and a maximum capacitance value among the measured capacitance values, and the step of calculating the resulting capacitance value is a step of calculating an average capacitance value based on the minimum capacitance value and maximum capacitance value.

According to one embodiment, the step of calculating the resulting capacitance value is a step of calculating an average capacitance value based on the at least two measured capacitance values.

According to one embodiment, the database further comprises first capacitance variation ranges defined for the interdigitated capacitive sensors, each first variation range being defined for an interdigitated capacitive sensor, the first variation ranges being representative of a status of occupied by a person, and the method further comprises, for each interdigitated capacitive sensor, a step of comparing the calculated difference to the first variation range, the determined occupancy status being the status of occupied by a person when the differences calculated for each interdigitated capacitive sensor are comprised within the first variation ranges.

According to one embodiment, the database further comprises at least two capacitance variation subdomains defined for each interdigitated capacitive sensor, each capacitance variation subdomain being representative of a morphological type of a person, and the method comprises the following steps:

comparing the calculated differences to at least two capacitance variation subdomains; and determining a morphological type of the person sitting in the seat, based on the result of the comparison.

According to one embodiment, the database further comprises second capacitance variation ranges defined for the interdigitated capacitive sensors, each second variation range being defined for a capacitance sensor, the second variation ranges being representative of a status of occupied by a thing, an animal, or a child, and the method further comprises, for each interdigitated capacitive sensor, a step of comparing the calculated difference to the second variation range, the determined occupancy status being the status of occupied by a thing, an animal, or a child, when the average capacitance values calculated for each interdigitated capacitive sensor are comprised within the second capacitance variation ranges.

According to one embodiment, the database further comprises at least two capacitance variation subdomains defined for the interdigitated capacitive sensors and respectively, each capacitance variation subdomain being representative of a range of child age values, and the method further comprises the following steps:

comparing the calculated differences to at least two capacitance variation subdomains, and determining a range of child age values, based on the result of the comparison.

According to one embodiment, the measurement step is implemented each time a door of the motor vehicle is opened or unlocked.

According to one embodiment, the measurement step is implemented each time a door of the motor vehicle is closed or locked.

According to one embodiment, the implementation of the measurement step lasts less than three seconds and preferably less than one second.

According to one embodiment, the memory comprises, for each interdigitated capacitive sensor, a curve representing average capacitance values as a function of time, and a determined deviation, and the method further comprises the following steps, implemented, for each interdigitated capacitive sensor, after the step of determining a maximum capacitance value and a minimum capacitance value:

selecting a determined number of last capacitance values of the curve, the determined number being between 5 and 20, and preferably equal to 10, calculating the difference between the minimum capacitance value and the selected values, calculating the difference between the maximum capacitance value and the selected values, if at least one of the differences is greater than the deviation, the method returns to the measurement step, if the differences are less than the deviation, the method continues via the step of calculating a resulting capacitance value.

According to one embodiment, when the differences are less than the deviation, the method comprises a step of saving the average capacitance value in the curve.

According to one embodiment, the curve comprises a capacitance value measured after the manufacture of the seat and before its mounting in the vehicle, a capacitance value measured after the mounting of the seat in the motor vehicle, and a capacitance value measured before its first use.

The present disclosure also relates to a system for determining the occupancy status of a seat of a motor vehicle, the system comprising:

a motor vehicle seat comprising:

a seating portion having a receiving face intended to accommodate a person, the receiving face being divided into a front area and a rear area, the front area and the rear area being located one on either side of a transverse central plane of the seat, a backrest having a receiving face intended to accommodate the back of a person, the backrest being hinged to the seating portion, the rear area of the receiving face of the seating portion being adjacent to the backrest, only three interdigitated capacitive sensors carried by the receiving face of the backrest, and only three interdigitated capacitive sensors carried by the receiving face of the seating portion, a first interdigitated capacitive sensor being located on an upper side area of the receiving face of the backrest, the second interdigitated capacitive sensor being located on a lower area or a central area of the receiving face of the backrest, the third interdigitated capacitive sensor being located on a side area of the receiving face of the backrest, the third interdigitated capacitive sensor being located at a lower position relative to the second capacitive sensor, the second interdigitated capacitive sensor being laterally offset towards the center relative to the first and third interdigitated capacitive sensors, the fourth interdigitated capacitive sensor being located on a lateral portion of the rear area of the receiving face of the seating portion, the fifth interdigitated capacitive sensor being located on a rear or central area of the receiving face of the seating portion, the sixth interdigitated capacitive sensor being located on a lateral portion of the front area of the receiving face of the seating portion, the fifth interdigitated capacitive sensor being laterally offset towards the center relative to the fourth and sixth interdigitated capacitive sensors, the fifth interdigitated capacitive sensor being located longitudinally between the fourth and sixth interdigitated capacitive sensors, a controller suitable for implementing the method for determining the occupancy status of a seat according to the characteristics mentioned above.

According to one embodiment, the second interdigitated capacitive sensor is laterally positioned in the center of the receiving face of the seat, and the fifth interdigitated capacitive sensor is laterally positioned in the center of the receiving face.

The invention claimed is:

1. A method for determining the occupancy status of a seat of a motor vehicle, the method being implemented by a determination system comprising a seat, at least six interdigitated capacitive sensors carried by the seat, and a controller connected to the interdigitated capacitive sensors, the controller comprising a memory comprising a database, the database comprising at least one reference capacitance value and one threshold value for each interdigitated capacitive sensor, the method comprising measuring at least three capacitance values for each interdigitated capacitive sensor, the following steps being implemented by the controller for the capacitance values measured by each interdigitated capacitive sensor:

calculating a resulting capacitance value based on at least two measured capacitance values, calculating the difference between the resulting capacitance value and the reference capacitance value, comparing the calculated difference to the threshold value, and determining the occupancy status of the seat, based on the result of the comparison.

2. The method of claim 1, further comprising determining a minimum capacitance value and a maximum capacitance value among the measured capacitance values, and wherein calculating the resulting capacitance value includes calculating an average capacitance value based on the minimum capacitance value and maximum capacitance value.

3. The method of claim 1, wherein the database further comprises second capacitance variation ranges defined for the interdigitated capacitive sensors, each second variation range being defined for a capacitance sensor, the second variation ranges being representative of a status of occupied by a thing, an animal, or a child, and wherein the method further comprises, for each interdigitated capacitive sensor, comparing the calculated difference to the second variation range, the determined occupancy status being a status of occupied by a thing, an animal, or a child, when the average capacitance values calculated for each interdigitated capacitive sensor are comprised within the second capacitance variation ranges.

4. The method of claim 3, wherein the database further comprises at least two capacitance variation subdomains defined for the interdigitated capacitive sensors and respectively, each capacitance variation subdomain being representative of a range of child age values, and wherein the method further comprises:

comparing the calculated differences to at least two capacitance variation subdomains, and determining a range of child age values, based on the result of the comparison.

5. The method of claim 1, wherein calculating the resulting capacitance value includes calculating an average capacitance value based on the at least two measured capacitance values.

6. The method according to claim 5, wherein the database further comprises second capacitance variation ranges defined for the interdigitated capacitive sensors, each second variation range being defined for a capacitance sensor, the second variation ranges being representative of a status of occupied by a thing, an animal, or a child, and wherein the method further comprises, for each interdigitated capacitive sensor, comparing the calculated difference to the second variation range, the determined occupancy status being a status of occupied by a thing, an animal, or a child, when the average capacitance values calculated for each interdigitated capacitive sensor are comprised within the second capacitance variation ranges.

7. The method of claim 1, wherein the database further comprises first capacitance variation ranges defined for the interdigitated capacitive sensors, each first variation range being defined for an interdigitated capacitive sensor, the first variation ranges being representative of a status of occupied by a person, and wherein the method further comprises, for each interdigitated capacitive sensor:

comparing the calculated difference to the first variation range, the determined occupancy status being the status of occupied by a person when the differences calculated for each interdigitated capacitive sensor are comprised within the first variation ranges.

8. The method of claim 7, wherein the database further comprises at least two capacitance variation subdomains defined for each interdigitated capacitive sensor, each capacitance variation subdomain being representative of a morphological type of a person, and wherein the method comprises:

comparing the calculated differences to at least two capacitance variation subdomains; and determining a morphological type of the person sitting in the seat, based on the result of the comparison.

9. The method of claim 1, wherein the method includes measuring at least three capacitance values for each interdigitated capacitive sensor each time a door of the motor vehicle is opened or unlocked.

10. The method of claim 1, wherein the method includes measuring at least three capacitance values for each interdigitated capacitive sensor each time a door of the motor vehicle is closed or locked.

11. The method of claim 1, wherein measuring at least three capacitance values for each interdigitated capacitive sensor lasts less than three seconds.

12. The method of claim 11, wherein measuring at least three capacitance values for each interdigitated capacitive sensor lasts less than one second.

13. The method of claim 1, wherein the memory comprises, for each interdigitated capacitive sensor, a curve representing average capacitance values as a function of time, and a determined deviation, and wherein the method further comprises the following steps, implemented, for each interdigitated capacitive sensor:

determining a minimum capacitance value and a maximum capacitance value among the measured capacitance values, selecting a determined number of last capacitance values of the curve, the determined number being between 5 and 20, calculating the difference between the minimum capacitance value and the selected values, calculating the difference between the maximum capacitance value and the selected values, if at least one of the differences is greater than the deviation, the method returns to the measurement step, if the differences are less than the deviation, the method continues via the step of calculating a resulting capacitance value.

14. The method of claim 13, wherein, if the differences are less than the deviation, the method comprises saving the average capacitance value in the curve.

15. The method of claim 13, wherein the curve comprises a capacitance value measured after the manufacture of the seat and before its mounting in the vehicle, a capacitance value measured after the mounting of the seat in the motor vehicle, and a capacitance value measured before its first use.

16. The method of claim 13, wherein the determined number is equal to 10.

17. A system for determining the occupancy status of a seat of a motor vehicle, the system comprising:

a motor vehicle seat comprising:

a seating portion having a receiving face intended to accommodate a person, the receiving face being divided into a front area and a rear area, the front area and the rear area being located one on either side of a transverse central plane of the seat, a backrest having a receiving face intended to accommodate the back of a person, the backrest being hinged to the seating portion, the rear area of the receiving face of the seating portion being adjacent to the backrest, only three interdigitated capacitive sensors carried by the receiving face of the backrest, and only three interdigitated capacitive sensors carried by the receiving face of the seating portion, a first interdigitated capacitive sensor being located on an upper side area of the receiving face of the backrest, the second interdigitated capacitive sensor being located on a lower area or a central area of the receiving face of the backrest, the third interdigitated capacitive sensor being located on a side area of the receiving face of the backrest, the third interdigitated capacitive sensor being located at a lower position relative to the second capacitive sensor, the second interdigitated capacitive sensor being laterally offset towards the center relative to the first and third interdigitated capacitive sensors, the fourth interdigitated capacitive sensor being located on a lateral portion of the rear area of the receiving face of the seating portion, the fifth interdigitated capacitive sensor being located on a rear or central area of the receiving face of the seating portion, the sixth interdigitated capacitive sensor being located on a lateral portion of the front area of the receiving face of the seating portion, the fifth interdigitated capacitive sensor being laterally offset towards the center relative to the fourth and sixth interdigitated capacitive sensors, the fifth interdigitated capacitive sensor being located longitudinally between the fourth and sixth interdigitated capacitive sensors, the controller suitable for implementing the method for determining the occupancy status of a seat in accordance with claim 1.

18. The system of claim 17, wherein the second interdigitated capacitive sensor is laterally positioned in the center of the receiving face of the seat, and wherein the fifth interdigitated capacitive sensor is laterally positioned in the center of the receiving face.

* * * * *